UNITED STATES PATENT OFFICE.

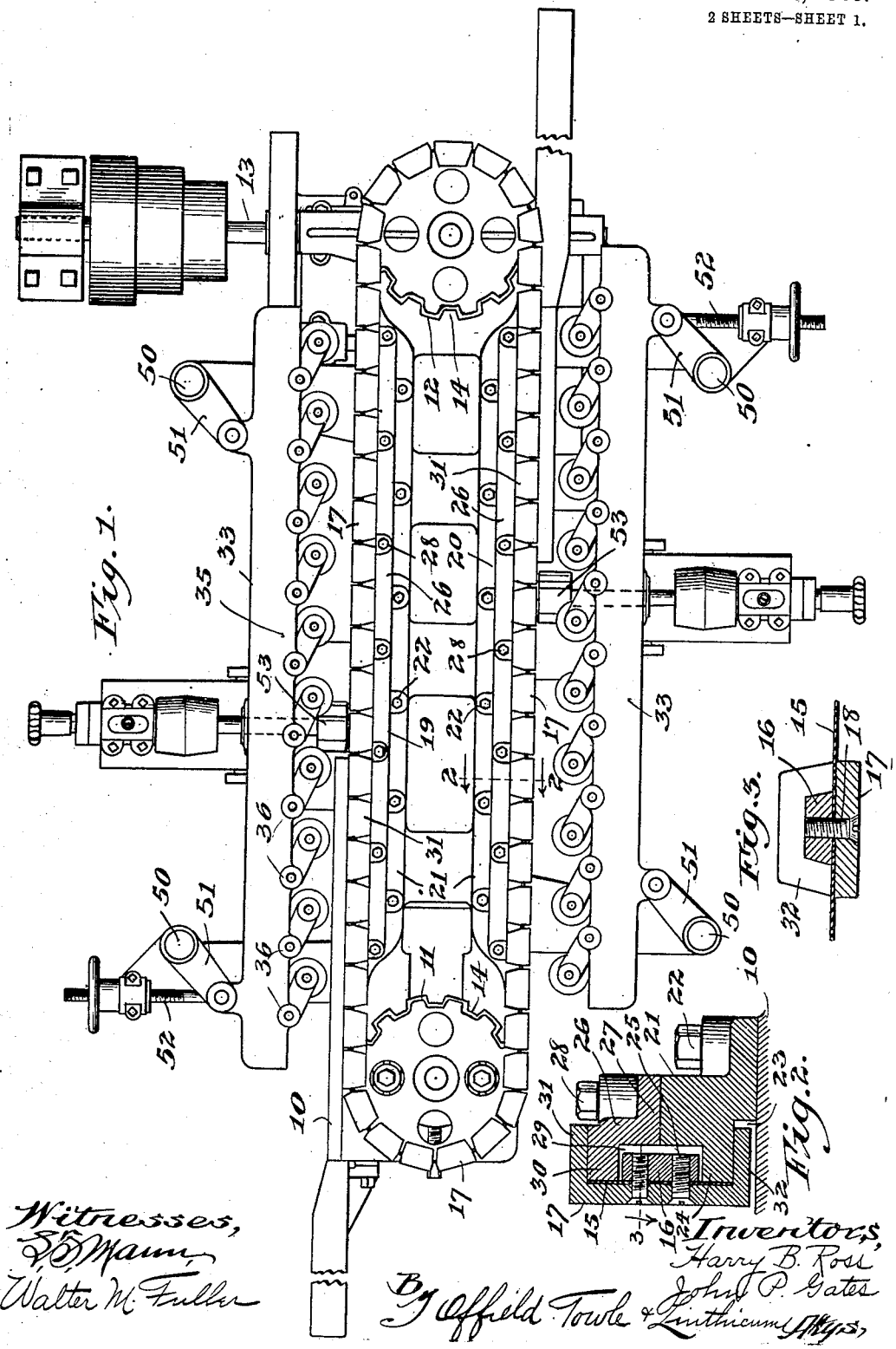

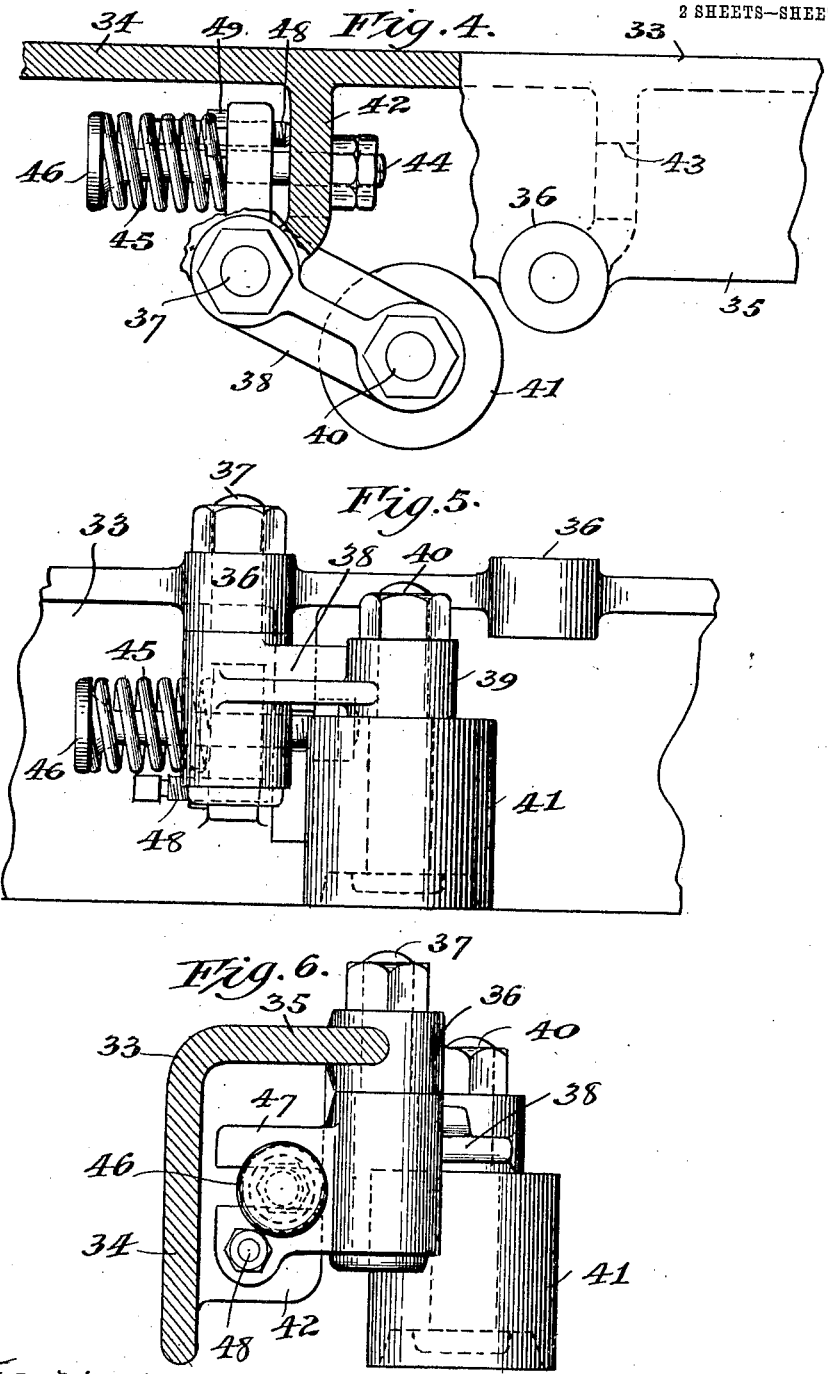

HARRY B. ROSS AND JOHN P. GATES, OF BELOIT, WISCONSIN, ASSIGNORS TO THE BERLIN MACHINE WORKS, OF BELOIT, WISCONSIN, A CORPORATION OF WISCONSIN.

FEEDING DEVICE FOR JOINTERS.

No. 913,852.        Specification of Letters Patent.        Patented March 2, 1909.

Application filed December 2, 1907. Serial No. 404,678.

*To all whom it may concern:*

Be it known that we, HARRY B. ROSS and JOHN P. GATES, citizens of the United States, residing at Beloit, in the county of Rock and State of Wisconsin, have jointly invented certain new and useful Improvements in Feeding Devices for Jointers, of which the following is a specification.

Our invention relates to the feeding mechanism of a variety of machines, particularly planers, and especially jointers. Its adaptability for employment or use in machines of widely different types and styles will be made apparent from the following detailed description of one embodiment of the invention in a glue jointer. In this improved construction the boards to be joined are fed to the machine edgewise and are advanced to the planer heads and knives and prevented from rising from the same or varying their position, except by their forward travel, by a feeding device comprising in the present instance a pair of rotatable wheels or pulleys notched or recessed on their cylindrical peripheries, a metallic band or belt passed around the wheels and having on its inner face a plurality of blocks or teeth shaped to conform to the recesses and adapted to enter the same as they pass around the wheels, whereby slipping of the band or belt is entirely prevented, and stretching of the same is obviated because of the material of which it is made, in the case under consideration— spring steel. The outer surface of the band or endless strap is equipped with a plurality or series of face or conveyer blocks forming a traveling bed or surface against which the boards are firmly pressed to prevent dislodgment or displacement by a row of stationary spring-actuated pressure-rollers on a pressure-bar mounted so as to have a parallel motion toward and from the traveling face blocks and adjustable by a manually-operated regulating screw. To hold the band or belt and its block up to the work, we supply one or more guides each composed of a longitudinally-divided guiding-bar against one surface of which the band is pressed, while the face blocks have legs or extensions overlapping the top and bottom surfaces of the guide, whereby elevation or descent of the traveling conveyer is effectually prevented. By this improved construction we obtain a conveyer belt which is incapable of stretching and which is always held in proper working position. In addition, owing to the parallel-motion mounting of the pressure bar and its spring-actuated rollers, a single screw suffices to effect desired adjustments.

On the accompanying drawings, forming a part of this specification, we have illustrated one desirable embodiment of our invention, showing the same applied to a glue jointer.

Figure 1 is a plan view of the machine; Fig. 2 is an enlarged cross-section on line 2—2 of Fig. 1 as viewed in the direction indicated by the arrows; Fig. 3 is a section on line 3 of Fig. 2; and Figs. 4, 5 and 6 are details of the mounting of the spring-actuated pressure rollers.

Referring first to Fig. 1, it will be noticed that at the opposite ends of the main supporting frame or table 10 is a pair of horizontal rotatable wheels or pulleys 11 and 12, the latter of which is driven by means of shaft 13 and an intermediate mechanism not illustrated. The cylindrical surface or periphery of each of these wheels or pulleys 11 and 12 is supplied with a series of tapered notches or recesses 14 equally spaced apart around the entire circumference of the wheels. Passing around these wheels or pulleys is an endless metallic band or belt 15 which has on its inner surface, and spaced apart to correspond to the distance between the notches 14, a series or plurality of tapered blocks or teeth 16 shaped to conform in size and contour to the recesses 14, whereby as the band or belt 15 passes around the wheels these teeth 16 enter the notches or grooves 14 exactly filling the spaces of the recesses 14 so that slipping of the belt or metallic band is entirely prevented. Substantially the entire outer face of the endless metal band 15 is covered with a series of face or conveying blocks 17 which are fastened individually to the teeth 16 by suitable screws 18 extending through apertures in the metal band and whose outer surfaces are plane and flat so that these outer faces on the stretches of the band between the pair of companion wheels form substantially flat vertical traveling surfaces. Adjacent to and inside of the long stretches of the band 15 are guides 19 and 20, each of which is composed of a long base portion 21 bolted at 22 to the bed or frame 10 of the machine, and having on its face toward the band 15 a bottom recess 23 an outwardly-projecting longitudinal strip and an upper recess 25. Bolted to the top of each of these longitudinal bars or guides 21 is another portion 26 having a base 27 resting on the top surface of the lower bar 21 and fastened thereto by the bolts 28. On its front face each bar 26 has a lower recess 29 and an outwardly-projecting portion 30. As is apparent from an inspection of Fig. 2, the two recesses 25 and 29 together or unitedly form a single longitudinal slot or groove on the face of the guide for the accommodation of the teeth or blocks 16 as they pass along. The upper and lower inner portions of the metallic band or belt 15 rest against the front faces of the projections 24 and 30, while the parallel tapered extensions or legs 31 and 32 at the top and bottom of each face block 17 overlie and underlie, respectively, the top and bottom surfaces of the projections 30 and 24.

In order to press or force the boards, the edges of which are to be planed, against the traveling bed or series of conveyer blocks 17 at both sides of the machine, we provide a pressure-bar 33 having a depending flange portion 34 and a top inwardly-extended part 35 equipped or supplied with a plurality of apertured bosses 36 through each of which extends a vertical bolt 37, on the lower portion of which is mounted, so as to turn, an arm 38 having at one end a perforated boss 39 through which passes a bolt 40 on the lower end of which a pressure-roller 41 is rotatable. Adjacent to each boss 36 an inwardly-extended web or bracket 42 connects the portions 34 and 35 of the pressure bar 33, and passing through a hole 43 of each of these brackets is a bolt 44, encircling which is a spring 45 disposed between the head 46 of the bolt and a bifurcated extension 47 of the arm 38 which straddles the bolt 44. It is obvious that the action of this spring is to turn the roller 41 toward the metallic band 15 and its attached blocks, and in order to limit this movement we provide a stop-screw 48 which passes through one of the legs of the bifurcated part 47 and normally abuts against an adjacent bracket 42. A lock nut 49 may be used if desired to prevent loosening or unturning of this screw.

The two ends of the pressure bar 33 are connecetd to suitable upright studs or shafts 50 by means of a pair of parallel links 51 of equal length which give the pressure bar a parallel motion, as is obvious. In order to adjust each of these bars and its series of rollers, we provide the same with an adjustment screw 52, the turning of which will regulate the position of the rollers and determine the pressure applied by the same to the boards.

The device has a pair of planer heads 53 with the usual cutters to plane or smooth off the edges of the boards which travel between the central conveyer and the rollers 41. It is to be understood that sufficient pressure is put upon the boards as they are fed edgewise through the two sides of the machine by the rollers to thrust the boards against the blocks 17 to prevent dislodgment or displacement of the boards while they are being acted upon by the cutters, the traveling conveyer carrying the boards along and feeding them through the machine, as is obvious.

To those skilled in the art it will be apparent that by using the metal band or belt described above the traveling conveyer has no stretching qualities, and for that reason we are enabled to advantageously use both long stretches of the conveyer belt as advancing means for the boards fed to the planer cutters. A machine of this kind does not possess the disadvantages of sprocket chains or the like, which after a comparatively short time of usage become worn to such an extent at the pivotal connections of the links with one another that it is necessary to discard them. The employment of the blocks or teeth 16 of exactly the same shape and size as the recesses of the pulleys or wheels prevents any possible slipping of the conveyer, and to some extent acts as driving means for the same. We have shown the two guides for the conveyer band as divided longitudinally so that if the inner surfaces of the extensions 31 and 32 of the face block 17 or the co-acting surfaces of the guide become worn, fillers may be placed between the two portions of the guide to increase its depth or width. By this means of guiding the band or belt any possibility of vertical movement or shifting of the same is entirely prevented.

Although we have described and illustrated only one embodiment of our invention, it is to be understood that a feeding mechanism of this character is applicable for use in machines of various kinds, and it is further to be noted that the invention is not limited to the precise structural details set forth, but that the construction may be varied within wide limits without departing from the spirit or essence of the invention or sacrificing any of its benefits or advantages.

We claim:

1. In a feeding mechanism for machines of the character described, the combination of a pair of wheels or pulleys with notched or recessed peripheries, a metallic band passed around said wheels or pulleys, blocks or teeth on the inner surface of said band shaped to conform to said notches or recesses and adapted to enter the same as the band travels, a grooved guide between said wheels or pulleys along one face of which said band is adapted to travel, the groove of the guide accommodating said blocks or teeth, a series of face blocks on the outer surface of said band, each of said face blocks having extensions adapted to overlap the opposite faces of said guide, and means to press boards or the like against said face blocks, the guide holding the band and face blocks up to the boards, substantially as described.

2. In a feeding mechanism for machines of the character described, the combination of an endless traveling conveyer having an endless metallic band, a pressure bar, a parallel-motion mounting for said pressure bar, a single screw to adjust said pressure bar toward and from said conveyer, and a plurality of spring-pressed rollers on said pressure bar adapted to press a board or the like against said conveyer, substantially as described.

3. In a feeding mechanism for machines of the character described, the combination of a pair of wheels with notched or recessed peripheries, an endless metallic band passed around said wheels, blocks or teeth on the inner surface of said band adapted to enter said notches or recesses as the band travels, a series of face blocks on the outer surface of said band constituting an endless traveling conveyer, a pressure bar, a parallel-motion mounting for said pressure bar, means to adjust said pressure bar toward and from said metallic band, and a plurality of rollers mounted on said pressure bar, and adapted to engage boards and press them against said face blocks substantially as described.

4. In a feeding mechanism for machines of the character described, the combination of a pair of wheels or pulleys with notched or recessed peripheries, an endless metallic band passed around said wheels or pulleys, blocks or teeth on the inner surface of said band shaped to conform to said notches or recesses and adapted to enter the same as the band travels, a guide between said wheels or pulleys along one face of which said band is adapted to travel, a series of face blocks on the outer surface of said band, a pressure bar, a parallel-motion mounting for said pressure bar, a single screw to adjust said pressure bar toward and from said metallic band, and a plurality of spring-pressed rollers on said pressure bar, and adapted to engage boards and press them against said face blocks substantially as described.

HARRY B. ROSS.
JOHN P. GATES.

Witnesses to the signature of Harry B. Ross:
    J. A. THORSON,
    F. L. LANE.

Witnesses to the signature of John P. Gates:
    L. M. RANDALL,
    W. S. PERKINS.